United States Patent
Qi

(10) Patent No.: US 7,693,108 B2
(45) Date of Patent: Apr. 6, 2010

(54) METHODS AND APPARATUS FOR PROVIDING A HANDOVER CONTROL SYSTEM ASSOCIATED WITH A WIRELESS COMMUNICATION NETWORK

(75) Inventor: Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 11/497,670

(22) Filed: Aug. 1, 2006

(65) Prior Publication Data

US 2008/0062922 A1 Mar. 13, 2008

(51) Int. Cl.
*H04W 4/00* (2009.01)
(52) U.S. Cl. .................. 370/331; 370/332; 370/334; 370/328; 370/338; 455/436; 455/437
(58) Field of Classification Search ......... 370/331–334; 455/436–444
See application file for complete search history.

(56) References Cited

U.S. PATENT DOCUMENTS

| 6,628,631 B1* | 9/2003 | Mazawa et al. ............. 370/331 |
| 6,859,444 B1* | 2/2005 | Vancraeynest .............. 370/331 |
| 6,982,987 B2* | 1/2006 | Cain .......................... 370/442 |
| 2002/0085516 A1 | 7/2002 | Bridgelall |
| 2003/0179756 A1* | 9/2003 | Cain ...................... 370/395.42 |
| 2005/0060551 A1* | 3/2005 | Barchi et al. ................ 713/182 |
| 2005/0186939 A1* | 8/2005 | Barnea et al. ............... 455/405 |
| 2005/0250498 A1* | 11/2005 | Lim et al. ................... 455/436 |
| 2005/0286466 A1* | 12/2005 | Tagg et al. .................. 370/329 |
| 2006/0003768 A1 | 1/2006 | Chiou |
| 2006/0133317 A1* | 6/2006 | Hurtta ........................ 370/331 |
| 2006/0215607 A1* | 9/2006 | Mitchel et al. .............. 370/331 |
| 2007/0086381 A1* | 4/2007 | Lee et al. .................... 370/331 |
| 2007/0232307 A1* | 10/2007 | Ibrahim et al. ............. 455/436 |
| 2007/0280453 A1* | 12/2007 | Kelley et al. .......... 379/201.01 |
| 2008/0181161 A1* | 7/2008 | Gi Kim et al. .............. 370/312 |

FOREIGN PATENT DOCUMENTS

KR 1020010017860 A 3/2001
KR 1020040042937 A 5/2004

OTHER PUBLICATIONS

International Search Report issued in International Application No. PCT/US2007/074244, mailed Nov. 28, 2007, 4 pgs.

* cited by examiner

*Primary Examiner*—Kamran Afshar
*Assistant Examiner*—Ezana Getachew
(74) *Attorney, Agent, or Firm*—Schwabe, Williamson & Wyatt, P.C.

(57) ABSTRACT

Embodiments of methods and apparatus for providing a handover control system associated with a wireless communication network are generally described herein. Other embodiments may be described and claimed.

25 Claims, 5 Drawing Sheets

METHODS AND APPARATUS FOR PROVIDING A HANDOVER CONTROL SYSTEM ASSOCIATED WITH A WIRELESS COMMUNICATION NETWORK

TECHNICAL FIELD

The present disclosure relates generally to wireless communication systems, and more particularly, to methods and apparatus for providing a handover control system associated with a wireless communication network.

BACKGROUND

As wireless communication becomes more and more popular at offices, homes, schools, etc., different wireless technologies and applications may work in tandem to meet the demand for computing and communications at anytime and/or anywhere. For example, a variety and/or plurality of wireless communication networks may coexist to provide a wireless environment with more computing and/or communication capability, greater mobility, and/or eventually seamless roaming.

In particular, wireless personal area networks (WPANs) may offer fast, short-distance connectivity within a relatively small space such as an office workspace or a room within a home. Wireless local area networks (WLANs) may provide broader range than WPANs within office buildings, homes, schools, etc. Wireless metropolitan area networks (WMANs) may cover a greater distance than WLANs by connecting, for example, buildings to one another over a broader geographic area. Wireless wide area networks (WWANs) may provide the broadest range as such networks are widely deployed in cellular infrastructure. Although each of the above-mentioned wireless communication networks may support different usages, coexistence among these networks may provide a more robust environment with anytime and anywhere connectivity.

DETAILED DESCRIPTION

In general, methods and apparatus for providing a handover control system associated with a wireless communication network are described herein. The methods and apparatus described herein are not limited in this regard.

Figure 1:
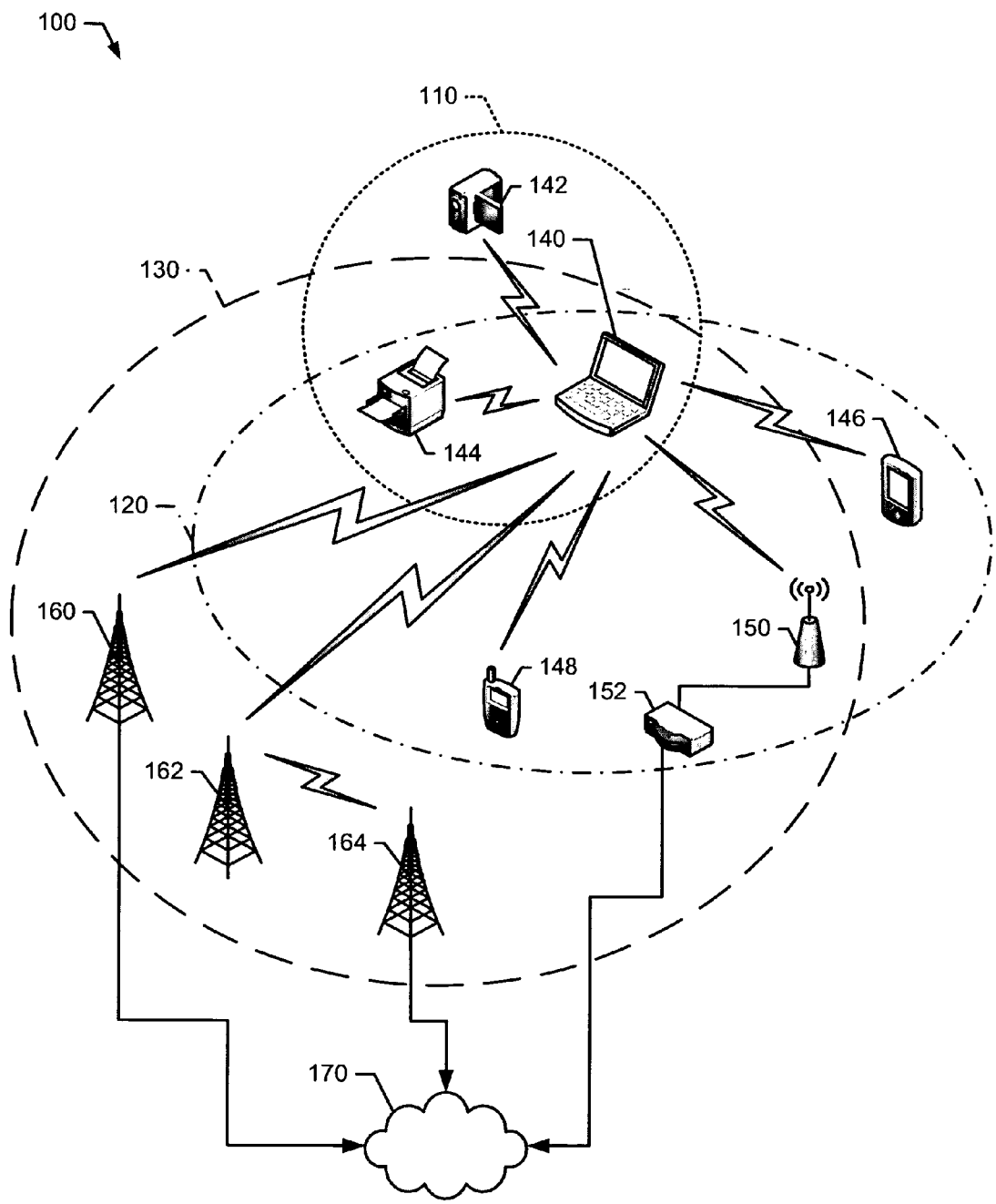
FIG. 1 is a schematic diagram representation of an example wireless communication system according to an embodiment of the methods and apparatus disclosed herein.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication system 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five subscriber stations, the wireless communication system 100 may include more or less subscriber stations.

Each of the subscriber stations 140, 142, 144, 146, and 148 may be authorized or allowed to access services provided by one or more of the wireless communication networks 110, 120, and/or 130. The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation (e.g., orthogonal frequency-division multiple access (OFDMA)), multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004 (published Sep. 18, 2004), the IEEE std. 802.16e (published Feb. 28, 2006), the IEEE std. 802.16f (published Dec. 1, 2005), etc.) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, 3GPP technology, standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
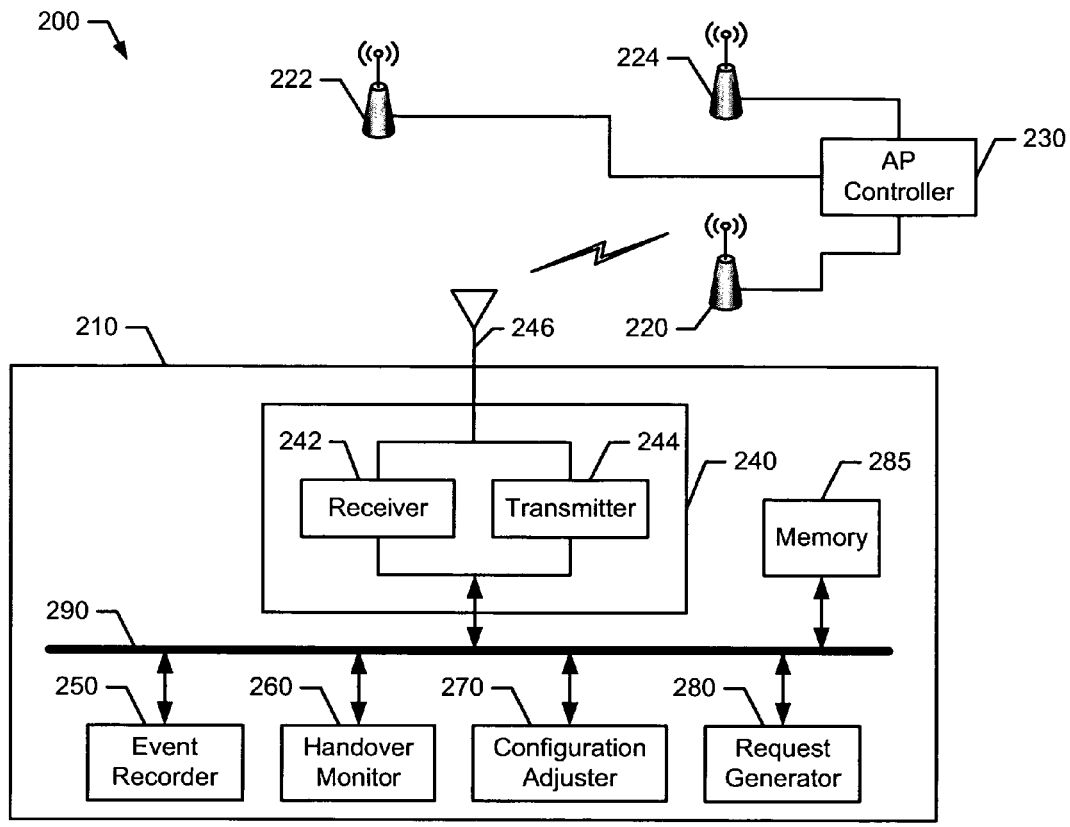
FIG. 2 is a block diagram representation of an example wireless local area network (WLAN).

In the example of FIG. 2, a wireless communication network 200 may include a subscriber station (STA) 210 and one or more access points (AP), generally shown as 220, 222, and 224. The wireless communication network 200 may also include an AP controller 230 operatively coupled to the APs 220, 222, and 224. For example, the wireless communication network 200 may be a WLAN operating in accordance with the IEEE 802.11 family of standards, and/or variations and evolutions of these standards (e.g., IEEE 802.11 Task Group k (Radio Resource Measurement Enhancements), IEEE 802.11 Task Group r (Fast Roaming/Fast BSS Transition), and/or IEEE 802.11 Task Group v (Wireless Network Management)). Although FIG. 2 depicts a WLAN, the methods and apparatus described herein are readily applicable to other types of wireless communication networks such as WPANs, WMANs, WWANs, and/or wireless mesh networks. In one example, the wireless communication network 200 may be a WMAN or a WWAN with one or more base stations instead of APs. Further, while FIG. 2 depicts a single subscriber station, the wireless communication network 200 may include additional subscriber stations. The wireless communication network 200 may also include additional APs even thought FIG. 2 depicts three APs.

In general, the subscriber station 210 may be any one of the wireless electronic devices mentioned above in connection with FIG. 1 or any combination thereof. The subscriber station 210 may include a network interface device (NID) 240, an event recorder 250, a handover monitor 260, a configuration adjuster 270, a request generator 280, and a memory 285. The NID 240, the event recorder 250, the handover monitor 260, the configuration adjuster 270, the request generator 280, and the memory 285 may be operatively coupled to each other via a bus 290. While FIG. 2 depicts one or more components of the subscriber station 210 coupling to each other via the bus 290, these components may be operatively coupled to each other via other suitable direct or indirect connections (e.g., a point-to-point connection or a point-to-multiple point connection).

The NID 240 may include a receiver 242, a transmitter 244, and an antenna 246. For example, the NID 240 may be a network interface card. The subscriber station 210 may receive and/or transmit data via the receiver 242 and the transmitter 244, respectively. The antenna 246 may include one or more directional or omni-directional antennas such as dipole antennas, monopole antennas, patch antennas, loop antennas, microstrip antennas, and/or other types of antennas suitable for transmission of radio frequency (RF) signals. Although FIG. 2 depicts a single antenna, the subscriber station 210 may include additional antennas. For example, the subscriber station 210 may include a plurality of antennas to implement a multiple-input-multiple-output (MIMO) system.

The event recorder 250 may record information associated with one or more transition events of the subscriber station 210. During each transition event, the subscriber station 210 may transition between two nodes (e.g., handover or handoff of the subscriber station 210 from one AP to another AP). For convenience, the terms "handover" and "handoff" may be used interchangeably throughout this disclosure to refer to the transition of a connection with a subscriber station from an AP to another AP. In one example, the subscriber station 210 may transition or roam from the AP 220 to the AP 222 because the subscriber station 210 may move out of range from a coverage area of the AP 220 and into a coverage area of the AP 222. In addition or alternatively, the AP 220 may be operating at capacity so the connection with the subscriber station 210 may be transferred to a neighbor AP of the AP 220 such as the AP 222. Accordingly, a handover of the connection with the subscriber station 210 may occur between the AP 220 and the AP 222. In another example, the subscriber station 210 may transition or roam from the AP 220 to the AP 224. A handover of the connection with the subscriber station 210 may occur between the AP 220 and the AP 224.

The handover monitor 260 may monitor for a condition indicative of frequent handover of the subscriber station 210 (e.g., hard handover, soft handover, softer handover, etc.). In one example, the handover monitor 260 may monitor for one or more transition events of the subscriber station 210 within a time period. The handover monitor 260 may detect a condition indicative of frequent handover of the subscriber station 210 if a predefined number of transition events occur within the time period (e.g., five transition events within one minute). For example, the handover monitor 260 may determine whether the number of transition events within the time period exceeds a predefined threshold.

To avoid frequent handover, the configuration adjuster 270 may adjust one or more configurations of the subscriber station 210 such as transmit power, roaming hysteresis, receive sensitivity, and/or clear channel assessment. In one example, the configuration adjuster 270 may adjust roaming hysteresis of the subscriber station 210 in response to detecting a condition indicative of frequent handover of the subscriber station 210. In particular, the configuration adjuster 270 may determine whether a difference in signal strength between a signal transmitted from an AP in communication with the subscriber station 210 (e.g., the AP 220) and a signal transmitted from a roaming candidate AP that may provide the subscriber station 210 with wireless communication services (e.g., the AP 222). For example, the configuration adjuster 270 may increase roaming hysteresis of the subscriber station 210 by increasing the roaming hysteresis threshold. As a result, the subscriber station 210 may require a greater difference in signal strength of signals received by the subscriber station 210 before transitioning from one AP to another AP. In addition, the configuration adjuster 270 may also adjust one or more configurations based on configuration information from the AP 220 and/or the AP controller 230 as described in detail below.

The request generator 280 may generate a roaming management request including transition event information associated with the transition events of the subscriber station 210. For example, the transition event information may include transition identification information, transition timestamp information, transition reason information, target identification information, source identification information, received signal strength indicator (RSSI) information, received signal-to-noise indicator (RSNI) information, transmit power information, roaming hysteresis information, receive sensitivity information, or clear channel assessment (CCA) information associated with each of the transition events of the subscriber station 210.

In general, the transition identification information may identify each transition event. The transition timestamp information may indicate when each transition event occurred (e.g., date and/or time). The transition reason information may indicate why each transition event occurred. The target identification information and the source identification information may indicate the target AP and the source AP of each transition event (e.g., BSSIDs of the target AP and the source AP). The RSSI information may indicate the received signal strength from the target AP at the subscriber station 210 for each transition event. The RSNI information may indicate the received signal-to-noise ratio from the source AP at the subscriber station 210 for each transition event.

The transmit power information may indicate the transmit power associated with a signal transmitted from the subscriber station 210 to the target AP and the source AP for each transition event. The roaming hysteresis information may indicate the difference in signal strength between a signal transmitted from the target AP and a signal transmitted from the source AP for each transition event. The receive sensitivity information may indicate a receive power associated with a signal received by the subscriber station 210 from each of the target AP and the source AP for each transition event. The CCA information may indicate a CCA associated with each of the target AP and the source AP for each transition event. The CCA threshold may account for noise and/or interference associated with a channel. To determine whether a particular channel is available, the subscriber station 210 may determine whether the receive power associated with a signal via that channel is less than the CCA threshold. If the receive power is less than the CCA threshold, that particular channel may be available for the subscriber station 210 to use.

In one example, the request generator 280 may generate the roaming management request after the configuration adjuster 270 adjusted roaming hysteresis of the subscriber station 210 but the handover monitor 260 may still detect a condition indicative of frequent handover of the subscriber station 210. Accordingly, the NID 240 may transmit the roaming management request to the AP 220. Based on the transition event information, the AP 220 may adjust one or more configurations of the AP 220. In one example, the AP 220 may adjust roaming hysteresis of the AP 220. The AP 220 may forward the transition event information to the AP controller 230. In particular, the AP 220 may generate a frequent handover avoidance request including the transition event information. Based on the transition event information, the AP controller 230 may adjust one or more configurations of an AP in communication with the subscriber station 210 (e.g., the AP 220) and/or one or more neighbor APs of the AP in communication with the subscriber station 210 (e.g., the APs 222 and/or 224). For example, the AP controller 230 may adjust transmit power, roaming hysteresis, receive sensitivity, and/or clear channel assessment of the APs 220, 222 and/or 224.

In addition or alternatively, the AP controller 230 may provide the subscriber station 210 with recommendations to reduce the number of transition events within a time period. The AP controller 230 may generate configuration information to adjust one or more configurations of the subscriber station 210 such of transmit power, roaming hysteresis, receive sensitivity, clear channel assessment, or roaming node candidate. In one example, the AP controller 230 may generate and transmit a frequent handover avoidance response including the configuration information to the AP 220. In turn, the AP 220 may generate and transmit a roaming management response including the configuration information to the subscriber station 210. Based on the configuration information, the configuration adjuster 270 may adjust one or more configurations of the subscriber station 210 to reduce the number of transition events within a time period.

Although the components shown in FIG. 2 are depicted as separate blocks within the subscriber station 210, the functions performed by some of these blocks may be integrated within a single semiconductor circuit or may be implemented using two or more separate integrated circuits. In one example, although the receiver 242 and the transmitter 244 are depicted as separate blocks within the NID 240, the receiver 242 may be integrated into the transmitter 244 (e.g., a transceiver). In another example, the event recorder 250, the handover monitor 260, the configuration adjuster 270, and/or the request generator 280 may integrated into a single component. Further, some of the blocks within the subscriber station 210 may be integrated into a network interface card (NIC) (not shown). For example, the NID 240, the event recorder 250, the handover monitor 260, the configuration adjuster 270, and/or the request generator 280 may be integrated into the NIC.

The access points 220, 222, and 224 may be associated with the same wireless communication network or different wireless communication networks. As described in detail below, the subscriber station 210 may be connected to two or more wireless communication networks simultaneously or concurrently. Although FIG. 2 depicts one or more basic service set (BSS) networks, the methods and apparatus described herein are readily applicable to other suitable networks such as an independent basic service set (IBSS) network. Further, while the above examples are described with respect to APs and AP controllers associated with WLANs, the methods and apparatus described herein are readily applicable to base stations (BS) and BS controllers associated with WMANs and/or WWANs and/or subscriber stations associated wireless mesh networks. The methods and apparatus described herein are not limited in this regard.

In general, frequent handover of the subscriber station 210 between APs may increase network load because of re-association and key re-generation for the subscriber station 210 to transition or roam from one AP to another AP. Further, frequent handover of the subscriber station 210 may cause interruption, reduce quality of service, and/or increase jitter in data, voice, and/or video streams.

Figure 3:
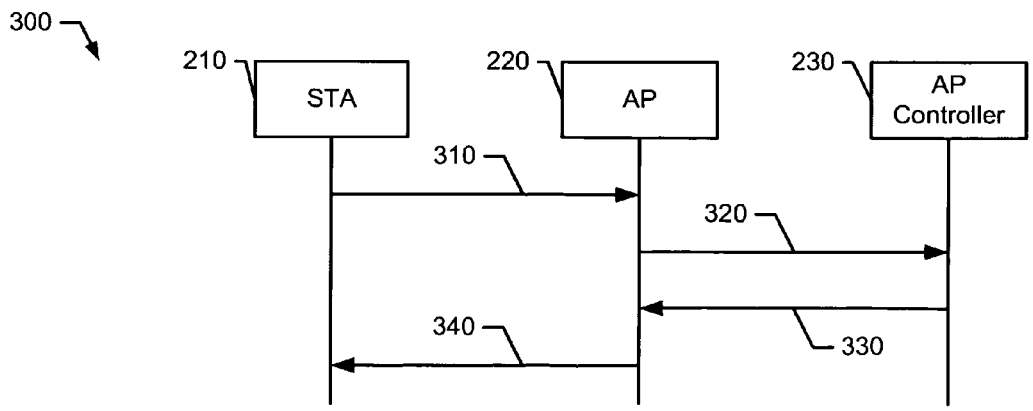
FIG. 3 depicts an example handover control system of the example WLAN of FIG. 2.

In the example of FIG. 3, a handover control system 300 may include a subscriber station (e.g., the subscriber station 210 of FIG. 2) and an AP (e.g., the AP 220 of FIG. 2). The handover control system 300 may also include an AP controller (e.g., the AP controller 230 of FIG. 2). Alternatively, the AP controller 230 may be integrated into the AP 220 or the handover control system 300 may not include the AP controller 230.

To illustrate the handover control system 300, the subscriber station 210 may record information associated with transition events of the subscriber station 210 and monitor for a condition indicative of frequent handover. In particular, the subscriber station 210 may determine whether the number of transition events within a time period exceeds a predefined threshold. In one example, five transition events within one minute may be indicative of frequent handover.

If the subscriber station 210 detects a condition indicative of frequent handover, the subscriber station 210 may increase roaming hysteresis to stay in communication with the AP 220 instead of switching to another AP (e.g., the AP 222 or 224 of FIG. 2). As noted above, roaming hysteresis may indicate a difference in signal strength between a signal transmitted from the AP in communication with the subscriber station 210 (e.g., the AP 220) and a signal transmitted from another AP (e.g., the AP 222). By increasing roaming hysteresis, for example, the subscriber station 210 may reduce frequent handover as a greater difference in signal strength between the signal from the AP 220 and the signal from the AP 222 before the subscriber station 210 may switch from the AP 220 to the AP 222.

However, if the subscriber station 210 still detects a condition indicative of frequent handover after increasing roaming hysteresis, the subscriber station 210 may forward transition event information to the AP 220. In one example, the subscriber station 210 may generate a roaming management request including the transition event information and transmit the roaming management request to the AP 220 (310). In turn, the AP 220 may generate a frequent handover avoidance request to forward the transition event information to the AP controller 230 (320).

Based on the transition event information, the AP controller 230 may adjust configuration of one or more APs neighboring the AP 220 (e.g., the APs 222 and/or 224 of FIG. 2). The AP controller 230 may also adjust roaming hysteresis associated with the AP 220. Further, the AP controller 230 may provide recommendations to the subscriber station 210 to avoid frequent handover. In particular, the AP controller 230 may generate and transmit a frequent handover avoidance response to the AP 220 (330). The frequent handover avoidance response may include configuration information. In particular, the configuration information may include information associated with transmit power setting, receiving sensitivity, and/or CCA threshold that the AP controller 230 may suggest to the subscriber station 210. The configuration information may also include information associated with one or more candidates that the AP controller 230 may suggest to the subscriber station 210 to roam to and connect with for wireless communication services.

Accordingly, the AP 220 may generate a roaming management response based on the frequent handover avoidance response from the AP controller 230 (340). In addition to the configuration information and the candidate information as described above, the AP 220 may also include information associated with roaming hysteresis in the roaming management response. That is, the AP 220 may recommend to the subscriber station 210 to adjust roaming hysteresis. Based on the roaming management response from the AP 220, the subscriber station 210 may adjust one or more configurations and/or switch to another AP (e.g., the AP 222 or the AP 224). The methods and apparatus described herein are not limited in this regard.

Figure 4:
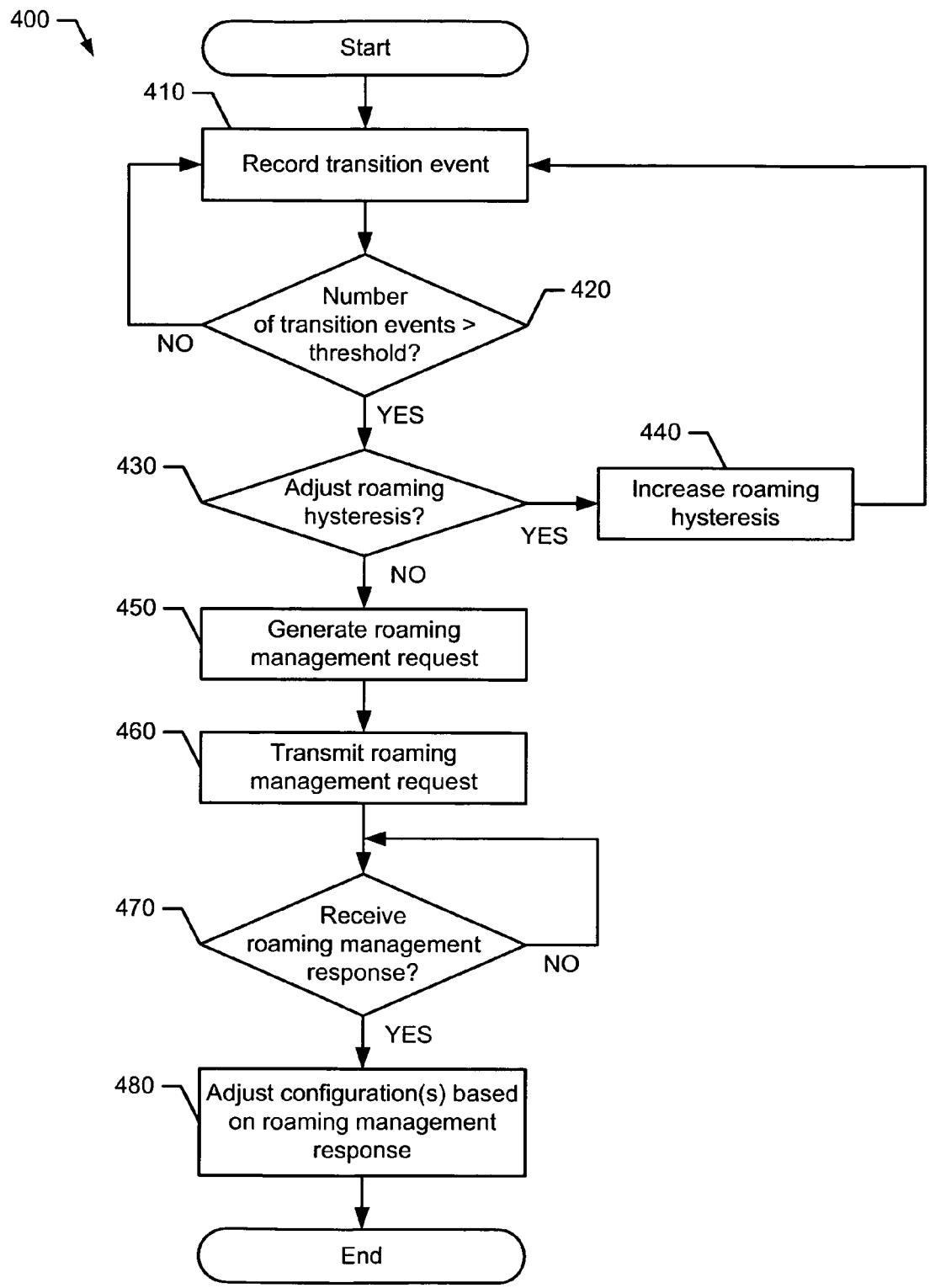
FIG. 4 depicts one manner in which an example subscriber station of the example handover control system of FIG. 2 may be configured.
Figure 5:
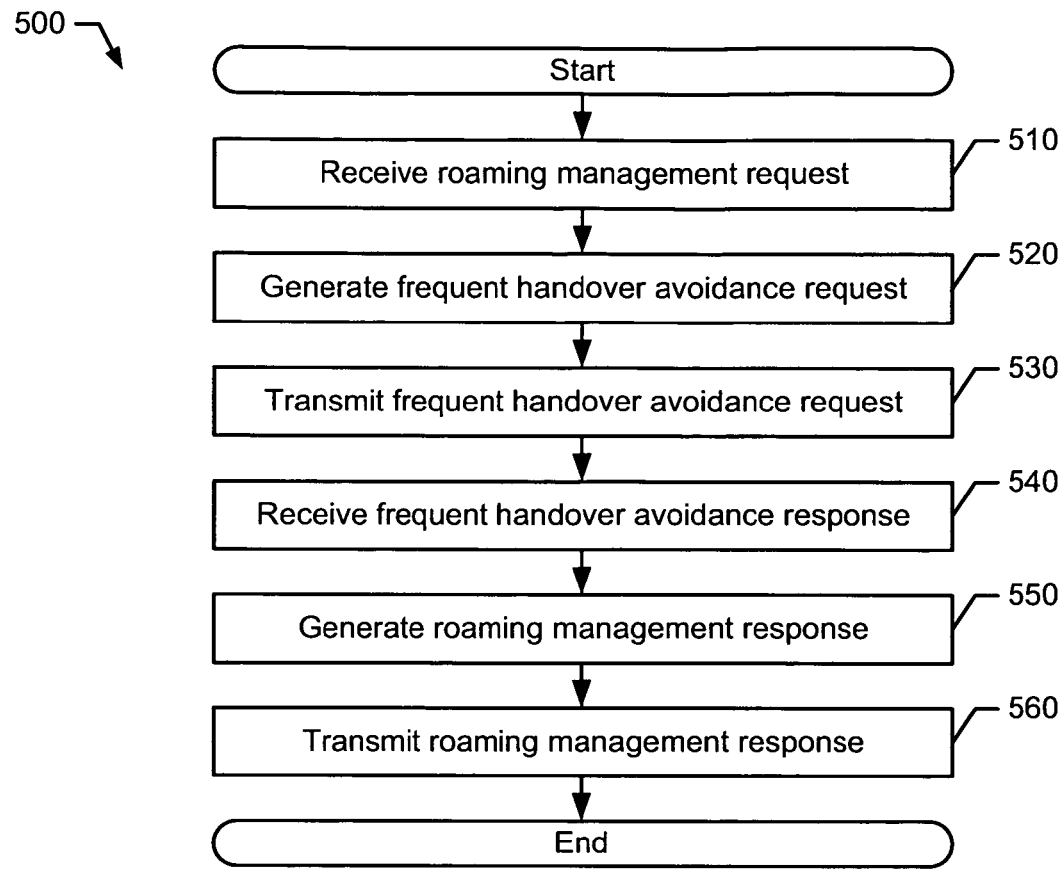
FIG. 5 depicts one manner in which an example access point (AP) of the example handover control system of FIG. 2 may be configured.
Figure 6:
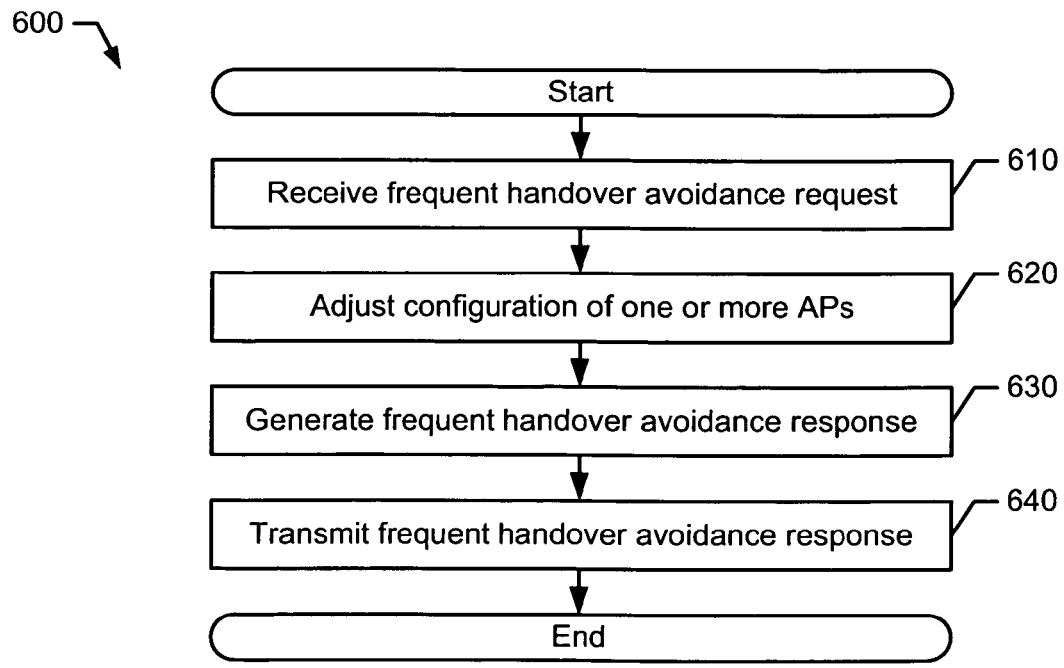
FIG. 6 depicts one manner in which an example AP controller of the example handover control system of FIG. 2 may be configured.

FIGS. 4, 5, and 6 depict one manner in which the handover control system 300 of FIG. 3 may be configured to detect and mitigate frequent handover. The example processes 400, 500, and 600 of FIGS. 4, 5, and 6, respectively, may be implemented as machine-accessible instructions utilizing any of many different programming codes stored on any combination of machine-accessible media such as a volatile or non-volatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a flash memory, a magnetic media, an optical media, and/or any other suitable type of medium.

Further, although a particular order of actions is illustrated in each of FIGS. 4, 5, and 6, these actions may be performed in other temporal sequences (e.g., simultaneously or concurrently). Again, the example processes 400, 500, and 600 are merely provided and described in conjunction with the wireless communication network of FIG. 2 as an example of one way to provide a handover control system.

In the example of FIG. 4, the process 400 may begin with the subscriber station 210 (e.g., via the event recorder 250 of FIG. 2) recording information associated with one or more transition events (block 410). The event recorder 250 may store the information associated with the transition events (e.g., statistics) in the memory 285.

As noted above, the subscriber station 210 may transition between two APs during each transition event (e.g., handover of the subscriber station 210 from one AP to another AP). To reduce network load and increase quality of service, the subscriber station 210 may monitor for a condition indicative of frequent handover. In particular, the subscriber station 210 (e.g., via the handover monitor 260 of FIG. 2) may monitor the number of transition events within a time period and determine whether the number of transition events exceeds a predefined handover threshold (block 420).

If the number of transition events does not exceed the predefined handover threshold, controls may return to block 410 to continue recording information associated with transition events. Otherwise if the number of transition events exceeds the predefined handover threshold at block 420, the subscriber station 210 (e.g., via the configuration adjuster 270 of FIG. 2) may determine whether to adjust roaming hysteresis of the subscriber station 210 (block 430).

If the subscriber station 210 did not previously adjust roaming hysteresis, the subscriber station 210 (e.g., via the configuration adjuster 270) may increase the roaming hysteresis threshold (block 440). Accordingly, controls may return to block 410 to record information associated with transition events.

Referring back to block 430, if the subscriber station 210 previously adjusted roaming hysteresis, the subscriber station 210 (e.g., via the request generator 280 of FIG. 2) may generate a roaming management request (block 450). The roaming management request may include transition event information. As noted above, the transition event information may include transition identification information, transition timestamp information, transition reason information, target identification information, source identification information, RSSI information, RSNI information, transmit power information, roaming hysteresis information, receive sensitivity information, or CCA information associated with each of the transition events of the subscriber station 210.

The subscriber station 210 (e.g., via the NID 240 of FIG. 2) may transmit the roaming management request to the AP 220 because the AP 220 is in communication with and provides services to the subscriber station 210 (block 460). Accordingly, the subscriber station 210 may monitor for a roaming management response from the AP 220 (block 470). As described in detail below in connection FIG. 5, the AP 220 may generate the roaming management response based on the roaming management request from the subscriber station 210.

Turning to FIG. 5, for example, the process 500 may begin with the AP 220 receiving the roaming management request from the subscriber station 210 (block 510). As noted above, the roaming management request may include transition event information. Based on the transition event information, the AP 220 may generate a frequent handover avoidance request (block 520). In particular, the frequent handover avoidance request may include the transition event information from the subscriber station 210. The frequent handover avoidance request may also include information associated with the AP 220 such as transmit power, receive sensitivity, and/or CCA of the AP 220. Accordingly, the AP 220 may transmit the frequent handover avoidance request to the AP controller 230 (block 530). As described in detail below in connection with FIG. 6, the AP controller 230 may generate a frequent handover avoidance response based on the frequent handover avoidance request from the AP 220.

In the example of FIG. 6, the process 600 may begin with the AP controller 230 receiving the frequent handover avoidance request from the AP 220 (block 610). As noted above, the frequent handover avoidance request may include the transition event information from the subscriber station 210 and/or other suitable information from the AP 220. Based on the transition event information, the AP controller 230 may adjust configuration of one or more APs such as the APs 220, 222, and/or 224 (block 620). In one example, the AP controller 230 may adjust configurations of one or more neighbor APs of the AP 220 (e.g., the APs 222 and/or 224) such as transmit power, receive sensitivity, and/or CCA.

The AP controller 230 may also provide recommendations to adjust one or more configurations of the subscriber station 210 to reduce frequent handover. In addition or alternatively, the AP controller 230 may recommend a roaming candidate AP for the subscriber station 210 to switch to so that the subscriber station 210 may avoid frequent handover. In particular, the AP controller 230 may generate a frequent handover avoidance response (block 630). For example, the frequent handover avoidance response may include configuration information such as transmit power information, receive sensitivity information, and/or CCA information. The configuration information may indicate a roaming candidate AP that the subscriber station 210 may transition to for wireless communication services. Accordingly, the AP controller 230 may transmit the frequent handover avoidance response to the AP 220 (block 640).

Although the above example is described with to an AP controller, the functions described in connection with the process 600 may be performed by an AP such as the AP 220. Further, while the above example is described with respect to WLANs, the methods and apparatus described herein may be implemented in other suitable wireless communication networks such as a wireless mesh network having a plurality of subscriber stations. In particular, the functions described in connection with the process 600 may be performed by one or more of the plurality of subscriber stations. The methods and apparatus described herein are not limited in this regard.

Turning back to FIG. 5, the AP 220 may receive the frequent handover avoidance response from the AP controller 230 (block 540). As noted above, the frequent handover avoidance response may include the configuration information for the subscriber station 210 and/or the AP 220. Based on the frequent handover avoidance response, the AP 220 may generate a roaming management response (block 550). In one example, the roaming management response may include the configuration information for the subscriber station 210. Accordingly, the AP 220 may transmit the roaming management response to the subscriber station 210 (block 560). The methods and apparatus described herein are not limited in this regard.

Referring back to block 470 of FIG. 4, if the subscriber station 210 does not receive a roaming management response from the AP 220, controls may continue to monitor for a roaming management response. Otherwise if the subscriber station 210 receives a roaming management response, the subscriber station 210 (e.g., via the configuration adjuster 270) may adjust one or more configurations of the subscriber station 210 based on the roaming management response (block 480). As noted above, the roaming management response may include the configuration information for the subscriber station 210. In one example, the subscriber station 210 may adjust transmit power, roaming hysteresis, receive sensitivity, and/or CCA. The configuration information may also include information associated with a roaming candidate. As a result, the subscriber station 210 may reduce the frequency of handover. The methods and apparatus described herein are not limited in this regard.

Although the above examples are described with an AP controller, the methods and apparatus described herein may be implemented without the AP controller or with the AP controller integrated within an AP. Referring to FIGS. 2 and 3 again, the AP 220 may receive the transition event information from the subscriber station 210 as described above. Instead of forwarding the transition event information to an AP controller (e.g., 320 of FIG. 3), the AP 220 may adjust one or more configurations associated with the AP 220 and/or the subscriber station 210. In one example, the AP 220 may increase the transmit power of the AP 220 to expand the coverage area of the AP 220 and/or cover one or more relatively weak portions of the coverage area. The AP 220 may also increase the roaming hysteresis of the subscriber station 210 so that the subscriber station 210 may stay with the AP 220 instead of switching to another AP (e.g., the AP 230 or 240 of FIG. 2). The AP 220 may also provide recommendations to adjust one or more configurations associated with the subscriber station 210. For example, the AP 220 may provide recommendations to adjust transmit power, receive sensitivity, and/or CCA associated with the subscriber station 210.

Further, while the above examples are described with respect to WLANs, the methods and apparatus described herein may be implemented in other suitable types of wireless communication networks such as WPANs, WMANs, WWANs, and/or wireless mesh networks. The methods and apparatus described herein are not limited in this regard.

Figure 7:
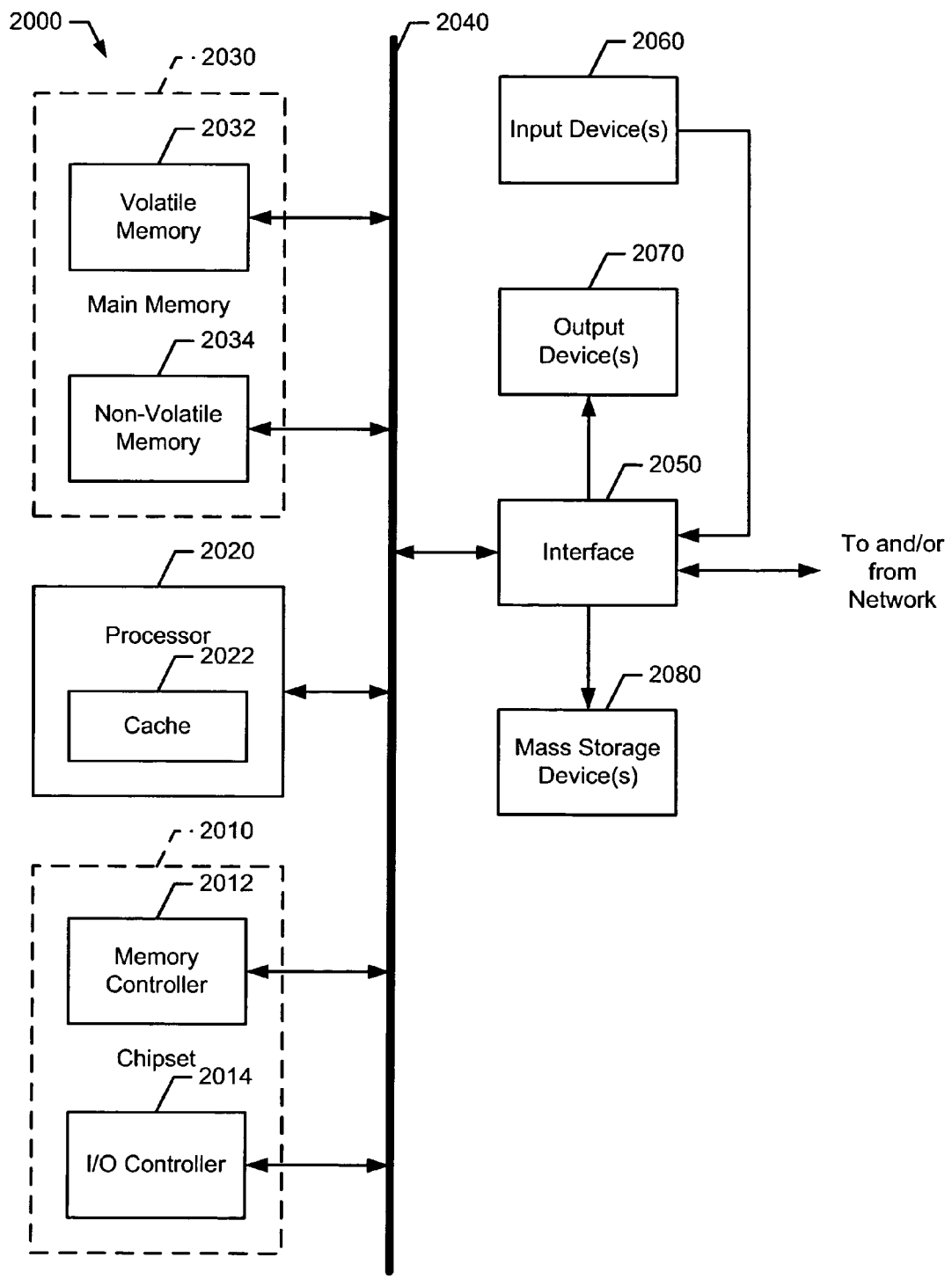
FIG. 7 is a block diagram representation of an example processor system that may be used to implement an example wireless communication platform of the example subscriber station of FIG. 2.

FIG. 7 is a block diagram of an example processor system 2000 adapted to implement the methods and apparatus disclosed herein. The processor system 2000 may be a desktop computer, a laptop computer, a handheld computer, a tablet computer, a personal digital assistant (PDA), a server, an Internet appliance, and/or any other type of computing device.

The processor system 2000 illustrated in FIG. 7 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WPAN components, WLAN components, WMAN components, WWAN components, and/or other suitable processing components. For example, the processor 2020 may be implemented using one or more of the Intel® Core™ technology, the Intel® Pentium® technology, the Intel® Itanium® technology, the Intel® Centrino™ technology, and/or the Intel® Xeon™ technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by synchronous dynamic random access memory (SDRAM), dynamic random access memory (DRAM), RAMBUS dynamic random access memory (RDRAM), static random access memory (SRAM) and/or any other type of random access memory device. The non-volatile memory 2034 may be implemented by flash memory, read only memory (ROM), electrically erasable programmable read only memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 7 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:
1. A method comprising:
monitoring, by a subscriber station, for a plurality of transition events within a time period, the subscriber station transitioning between two nodes of a plurality of nodes associated with a wireless communication network during the plurality of transition events;

determining, by the subscriber station, that the plurality transition events monitored during the time period has exceeded a predefined threshold;

generating, by the subscriber station, a roaming management request having transition event information associated with the plurality of transition events;

transmitting, by the subscriber station, the roaming management request to a node of the plurality of nodes associated with the wireless communication network to enable the node to adjust one or more configurations of the node to reduce further transition events by the subscriber station; and receiving, by the subscriber station, a roaming management response from the node, wherein the roaming management response includes configuration information for the subscriber station to reduce further transition events.

2. A method as defined in claim 1, wherein generating the roaming management request comprises generating a request having information associated with at least one of transition identification, transition timestamp, transition reason, target identification, source identification, received signal strength indicator, received signal-to-noise indicator, transmit power, roaming hysteresis, receive sensitivity, or clear channel assessment of each of the one or more transition events.

3. A method as defined in claim 1 further comprising recording information associated with each of the plurality of transition events to generate the transition event information.

4. A method as defined in claim 1 further comprising increasing roaming hysteresis of the subscriber station prior to generating the roaming management request.

5. A method as defined in claim 1, wherein the transmitting comprises transmitting the roaming management request to at least one of an access point associated with a wireless local area network, a base station associated with a wireless metropolitan area network, a base station associated with a wireless wide area network, or another subscriber station associated with a wireless mesh network.

6. A method as defined in claim 1 further comprising adjusting one or more configurations of the subscriber station to reduce handover of the subscriber station based on configuration information of the roaming management response from the node in communication with the subscriber station, the configuration information having information associated with at least one of transmit power, roaming hysteresis, receive sensitivity, clear channel assessment, or roaming candidate.

7. An article of manufacture including content, which when accessed, causes a machine to:

monitor for a plurality of transition events of a subscriber station within a time period, the subscriber station transitioning between two or more nodes of a plurality of nodes associated with a wireless communication network during each transition event;

determine that the plurality of transition events monitored during the time period has exceeded a predefined threshold;

generate a roaming management request at the subscriber station having transition event information associated with the one or more transition events;

transmit the roaming management request to a node of the plurality of nodes associated with the wireless communication network to enable the node to adjust one or more configurations of the node to reduce further transition events; and receive a roaming management response from the node, wherein the roaming management response includes configuration information for the subscriber station to further reduces transition events.

8. An article of manufacture as defined in claim 7, wherein the content, when accessed, causes the machine to generate the roaming management request by generating a request having information associated with at least one of transition identification, transition timestamp, transition reason, target identification, source identification, received signal strength indicator, received signal-to-noise indicator, transmit power, roaming hysteresis, receive sensitivity, or clear channel assessment of each of the plurality of transition events.

9. An article of manufacture as defined in claim 7, wherein the content, when accessed, causes the machine to increase roaming hysteresis of the subscriber station prior to generating the roaming management request.

10. An article of manufacture as defined in claim 7, wherein the content, when accessed, causes the machine to transmit the roaming management request to at least one of an access point associated with a wireless local area network, a base station associated with a wireless metropolitan area network, a base station associated with a wireless wide area network, or another subscriber station associated with a wireless mesh network.

11. An article of manufacture as defined in claim 7, wherein the content, when accessed, causes the machine to adjust one or more configurations of the subscriber station to reduce handover of the subscriber station based on configuration information of the roaming management response from the node in communication with the subscriber station, the configuration information having information associated with at least one of transmit power, roaming hysteresis, receive sensitivity, clear channel assessment, or roaming candidate.

12. An apparatus comprising:

a transition monitor to monitor for a plurality of transition events of a subscriber station within a time period and determine that the plurality of transition events monitored during the time period has exceeded a predefined threshold, the subscriber station transitioning between two or more nodes of a plurality of nodes associated with a wireless communication network during each transition event;

a request generator operatively coupled to the transition monitor to generate a roaming management request at the subscriber station, the roaming management request having transition event information associated with the plurality of transition events; and a network interface device operatively coupled to the request generator to transmit the roaming management request to a node of the wireless communication network to enable the node to adjust one or more configurations of the node to reduce further transition events of the subscriber device, and to receive a roaming management response, wherein the roaming management response includes configuration information for the subscriber station to further reduce transition events.

13. An apparatus as defined in claim 12, wherein the request generator is configured to generate a request having information associated with at least one of transition identification, transition timestamp, transition reason, target identification, source identification, received signal strength indicator, received signal-to-noise indicator, transmit power, roaming hysteresis, receive sensitivity, or clear channel assessment of each of the plurality of transition events.

14. An apparatus as defined in claim 12 wherein the network interface device is to transmit the roaming management request to at least one of an access point associated with a wireless local area network, a base station associated with a wireless metropolitan area network, a base station associated with a wireless wide area network, or another subscriber station associated with a wireless mesh network.

15. An apparatus as defined in claim 12 further comprising a configuration adjuster to increase roaming hysteresis of the subscriber station prior to the request generator generating the roaming management request.

16. An apparatus as defined in claim 12 further comprising a configuration adjuster to adjust one or more configurations of the subscriber station to reduce handover of the subscriber station based on configuration information of the roaming management response from the node in communication with the subscriber station, the configuration information having information associated with at least one of transmit power, roaming hysteresis, receive sensitivity, clear channel assessment, or roaming candidate.

17. A system comprising:
an omni-directional antenna; and
a processor operatively coupled to the antenna to monitor for a plurality of transition events of a subscriber station within a time period and to determine that the plurality of transition events monitored during the time period has exceeded a predefined threshold, to generate a roaming management request at the subscriber station, and to process a received roaming management response,
wherein the subscriber station transitions between two or more nodes of a plurality of nodes associated with a wireless communication network during each transition event,
wherein the roaming management request includes transition event information associated with the one or more transition events, and
wherein the roaming management response includes configuration information for the subscriber station to reduce further transition events.

18. A system as defined in claim 17, wherein the processor is configured to generate a request having information associated with at least one of transition identification, transition timestamp, transition reason, target identification, source identification, received signal strength indicator, received signal-to-noise indicator, transmit power, roaming hysteresis, receive sensitivity, or clear channel assessment of each of the plurality of transition events.

19. A system as defined in claim 17, wherein the processor is configured to increase roaming hysteresis of the subscriber station prior to generating the roaming management request.

20. A system as defined in claim 17, wherein the configuration information includes information associated with at least one of transmit power, roaming hysteresis, receive sensitivity, clear channel assessment, or roaming candidate.

21. A method comprising:
receiving, by a node controller, a frequent handover avoidance request from a node of a plurality of nodes associated with a wireless communication network, wherein the frequent handover avoidance request includes transition event information associated with one or more transition events of a subscriber station, the subscriber station transitioning between two nodes of the plurality of nodes associated with the wireless communication network during each transition event;
adjusting, by the node controller, one or more neighboring nodes of the plurality of nodes associated with the wireless communication network, wherein the neighboring nodes are neighbors of a node currently serving the subscriber station;
generating configuration information for the subscriber station to adjust one or more configurations of the subscriber station; and
transmitting the configuration information to the subscriber station via a roaming management response to enable the subscriber station to reduce further transition events.

22. A method as defined in claim 21, wherein adjusting the one or more neighboring nodes comprises adjusting at least one of transmit power, roaming hysteresis, receive sensitivity, or clear channel assessment of the one or more neighboring nodes.

23. A method as defined in claim 21 further comprising generating a frequent handover avoidance response having configuration information for at least one of the subscriber station, a node in communication with the subscriber station, or a neighbor node of the node in communication with the subscriber station.

24. A method as defined in claim 21 wherein the transmitting comprises transmitting configuration information having information associated with at least one of transmit power, roaming hysteresis, receive sensitivity, clear channel assessment, or roaming candidate.

25. A method as defined in claim 21, wherein the plurality of nodes comprises at least one of an access point associated with a wireless local area network, a base station associated with a wireless metropolitan area network, a base station associated with a wireless wide area network, or another subscriber station associated with a wireless mesh network.

* * * * *